(12) United States Patent
Beard

(10) Patent No.: US 10,353,601 B2
(45) Date of Patent: Jul. 16, 2019

(54) DATA MOVEMENT ENGINE

(71) Applicant: ARM Limited, Cambridge (GB)

(72) Inventor: Jonathan Curtis Beard, Austin, TX (US)

(73) Assignee: Arm Limited, Cambridge (GB)

( * ) Notice: Subject to any disclaimer, the term of this patent is extended or adjusted under 35 U.S.C. 154(b) by 235 days.

(21) Appl. No.: 15/361,843

(22) Filed: Nov. 28, 2016

(65) Prior Publication Data
US 2018/0150243 A1 May 31, 2018

(51) Int. Cl.
| | | |
|---|---|---|
| *G06F 12/0804* | (2016.01) | |
| *G06F 3/06* | (2006.01) | |
| *G06F 12/02* | (2006.01) | |
| *G06F 12/06* | (2006.01) | |
| *G06F 12/10* | (2016.01) | |
| *G06F 12/0811* | (2016.01) | |

(52) U.S. Cl.
CPC ............ *G06F 3/0619* (2013.01); *G06F 3/065* (2013.01); *G06F 3/067* (2013.01); *G06F 3/0659* (2013.01); *G06F 12/02* (2013.01); *G06F 12/0284* (2013.01); *G06F 12/0607* (2013.01); *G06F 12/0804* (2013.01); *G06F 12/0811* (2013.01); *G06F 12/10* (2013.01); *G06F 2212/1016* (2013.01); *G06F 2212/657* (2013.01)

(58) Field of Classification Search
CPC .............................. G06F 12/10; G06F 12/0238; G06F 12/0292; G06F 17/30324; G06F 17/30339; G06F 2212/202; G06F 3/0631; G06F 9/383; G06F 9/3879
See application file for complete search history.

(56) References Cited

U.S. PATENT DOCUMENTS 8,635,410 B1 * 1/2014 Kuskin ............... G06F 12/0891
711/141
2002/0073276 A1 6/2002 Howard et al.
(Continued)

FOREIGN PATENT DOCUMENTS

WO WO 2017/109618 6/2017

OTHER PUBLICATIONS

Zhang, Lixin, et al. "Pointer-based prefetching within the Impulse adaptable memory controller: Initial results." Proceedings of the Workshop on Solving the Memory Wall Problem. 2000. (Year: 2000).*

(Continued)

*Primary Examiner* — Charles Rones
*Assistant Examiner* — Hewy H Li
(74) *Attorney, Agent, or Firm* — Leveque IP Law, P.C.

(57) ABSTRACT

A memory system of a data processing system includes one or more storage devices and a data rearrangement engine for moving data between memory regions of the plurality of memory regions. The data rearrangement engine is configured to rearrange data stored at non-contiguous addresses in a source memory region into contiguous address in a destination region responsive to a rearrangement specified by a host processing unit of the data processing system. A description of the rearranged data is maintained in a metadata memory region. Rearranged data may be accessed by one or more host processing units. Write-back of data from the destination to the source region may be reduced by use of Bloom filter or the like.

24 Claims, 3 Drawing Sheets

(56) References Cited

U.S. PATENT DOCUMENTS

| | | | |
|---|---|---|---|
| 2002/0144070 A1* | 10/2002 | Watanabe | G06F 3/0617 711/165 |
| 2008/0235477 A1 | 9/2008 | Rawson | |
| 2013/0326186 A1 | 12/2013 | Shaikh et al. | |
| 2014/0136811 A1* | 5/2014 | Fleischer | G06F 13/28 711/207 |
| 2016/0124864 A1 | 5/2016 | Sun | |
| 2017/0177269 A1 | 6/2017 | Beard | |

OTHER PUBLICATIONS

University of British Columbia. <www.ece.ubc.ca/~edc/379.jan99/lectures/lec13.pdf>. (Year: 1999).*

CodingUnit. "C Tutorial—The functions malloc and free". <https://web.archive.org/web/20100503084842/https://www.codingunit.com/c-tutorial-the-functions-malloc-and-free>. May 2010. (Year: 2010).*

Krishnamurthy et al., J VLSI Signal Process Syst Signal Image Video Technol. 2007; 49(1): 101-121, Oct. 8, 2008.

Buhler et al., "Mercury BLASTN: Faster DNA Sequence Comparison Using a Streaming Hardware Architecture," in Proc. of Reconfigurable Systems Summer Institute, Jul. 2007.

Elliott et al., "Computational RAM: implementing processors in memory," in Design & Test of Computers, IEEE, vol. 16, No. 1, pp. 32-41, Jan.-Mar. 1999.

Lloyd et al., "In-Memory Data Rearrangement for Irregular, Data-Intensive Computing", Computer, vol. 48, No. 8, pp. 18-25, Aug. 2015.

Carter et al., "Impulse: building a smarter memory controller," in High-Performance Computer Architecture, 1999. Proceedings. Fifth International Symposium On, vol., No., pp. 70-79, Jan. 9-13, 1999.

Marty, Michael R. Cache coherence techniques for multicore processors. ProQuest, 2008.

Bloom, Burton H. "Space/time trade-offs in hash coding with allowable errors." Communications of the ACM 13.7 (1970): 422-426.

Hall et al., "Mapping Irregular Applications to DIVA, a PIM-based Data-Intensive Architecture," in Supercomputing, ACM/IEEE 1999 Conference, vol., No., pp. 57-57, Nov. 13-18, 1999.

Gokhale et al., "Processing in memory: The Terasys massively parallel PIM array." Computer 28.4 (1995): 23-31.

Dharmapurikar et al. "Deep packet inspection using parallel bloom filters." High performance interconnects, 2003. proceedings. 11th symposium on. IEEE, 2003.

Zhou et al., "HARD: Hardware-assisted lockset-based race detection." High Performance Computer Architecture, 2007. HPCA 2007. IEEE 13th International Symposium on. IEEE, 2007.

Liu et al., "RAIDR: Retention-aware intelligent DRAM refresh." Computer Architecture (ISCA), 2012 39th Annual International Symposium on. IEEE, 2012.

Rajwar et al., "Virtualizing transactional memory." Computer Architecture, 2005. ISCA'05. Proceedings. 32nd International Symposium on. IEEE, 2005.

Fung et al., "Hardware transactional memory for GPU architectures." Proceedings of the 44th Annual IEEE/ACM International Symposium on Microarchitecture. ACM, 2011.

Gokhale et al., "Near memory data structure rearrangement", Memory System, SCM, Oct. 5, 2015, pp. 283-290.

* cited by examiner

000
DATA MOVEMENT ENGINE

GOVERNMENT LICENSE RIGHTS

This invention was made with Government support under the Fast Forward 2 contract awarded by DOE. The Government has certain rights in this invention.

BACKGROUND

Computer applications executed on a host processor often access stored data in a non-sequential manner, so the accessed data values are not stored at contiguous memory addresses and resources are not used efficiently. For example, a contiguous block of data may be loaded into a cache line even though only a single value in the line is to be accessed. Thus, when data is not contiguous, cache lines are loaded and evicted more often than when data is contiguous. The problem may be mitigated by 'gathering' or packing data to be put into the cache from non-contiguous memory address. Data returned to the memory must be unpacked to contiguous memory locations, or 'scattered'. A disadvantage of this approach is that the number of transfers to and from memory is not reduced for the packing phase. For wider vectors, the number of transfers from memory to fill them can be quite significant with very low utilization. In addition, gather and scatter operations are also typically limited in the scope of rearrangement to bit-vector addresses or addresses dynamically generated by the host processor.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figures 1, 2:
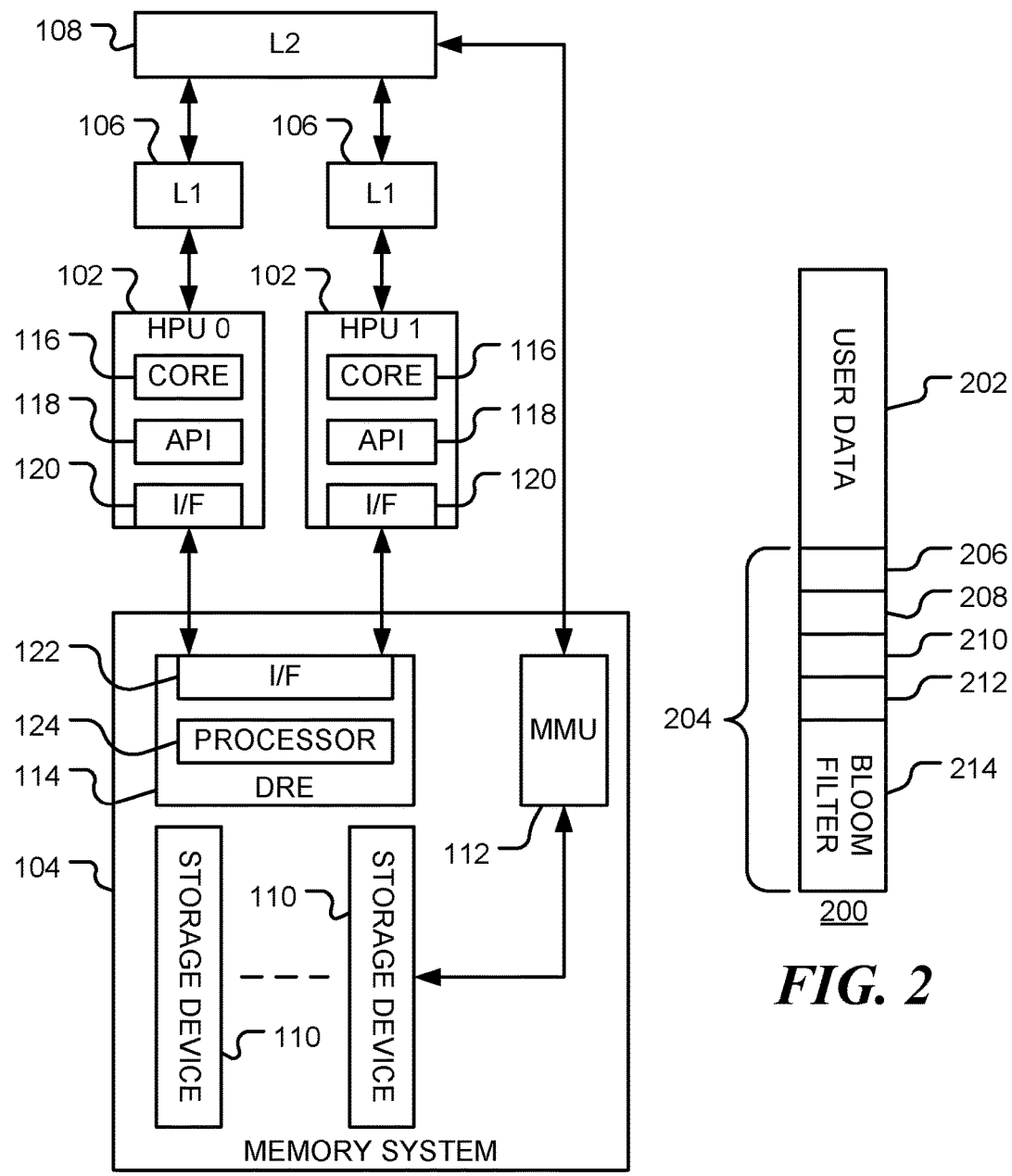
FIG. 1 is a block diagram of a data processing system, in accordance with various representative embodiments.
FIG. 2 is a diagrammatic representation of a memory region structured for rearranged data, in accordance with various representative embodiments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

As utilized herein, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

The present disclosure relates to a data processing system that includes a Data Reorganization Engine (DRE), also called a Data Movement Engine (DME) or a Sparse Data Reduction Engine (SPDRE), for example. The process of reading data from a memory, re-arranging it, modifying some of it, and writing the data back to the memory is used in many applications. A Data Reorganization Engine (DRE) takes data and reorganizes it, in a programmatic (or fixed) way as specified by a programmer or designer or in a probabilistic way as determined, for example, from analysis of prior data accesses. The rearranged data is stored in an allocated region of memory from where it may be accessed by a processing unit. The rearranged data segments map back to data segments in the original arrangement that are resident in a memory or storage device, such as a physical random access memory (RAM), disk, solid state drive (SSD), flash memory, Correlated Electron RAM (CeRAM) or some other form of storage.

One application of data rearrangement is the movement of data from a non-contiguous section of memory or other storage to a contiguous section of memory so that it can be fetched more efficiently from memory. In particular, data rearrangement may be utilized to pack data from sparse problems into contiguous regions so that the system can fully utilize memory access bursts and fully utilize cache lines within processor cores. That is, the data is converted from sparse data to dense data.

The memory system containing the DRE does not need to be fully connected to an on-chip coherence network. The memory system may include on-die memory devices such as a Hybrid Memory Cube (HMC), High Bandwidth Memory (HBM), standard dual inline memory modules (DIMMs) and non-volatile storage media. In-memory data rearrangement enables advanced rearrangements with more significant efficiency gains than other approaches.

In an approach described below, a rearrangement from a non-contiguous memory region or space S to a contiguous memory region or space S' results in a new physical mapping for S' and, potentially, a new virtual mapping. The contiguous region S' has the ability to map back (for synchronization) to the original noncontiguous space S.

The non-contiguous space S, from which S' is constructed, could be located on multiple pages. In general, these could be non-contiguous physical pages.

Data in region S may be non-interleaved or be located behind a logic controller which gathers from internal interleaved memory elements.

Rearrange functions may be predefined or defined by user-provided instructions. Example functions include: (1) fixed offset (e.g. evenly spaced data), (2) bijective function, where an address translation function maps S to S' and maps S' back to S, (3) dual function, where a forward address translation function maps S to S' and a reverse address translation function maps S' back to S.

For a fixed offset function, an address index i in S and a corresponding index i' in S' are related by $$i = i_0 + i' \times \text{offset}, \qquad (1)$$

where $i_0$ is a base address and offset is the offset value. The data value s' at address index i' in S' is related to the data value s in S by $$s'[i'] = s[i_0 + i' \times \text{offset}]. \qquad (2)$$

In an example programmed address translation function, an address index i in S and a corresponding index i' in S' are related by $$i = i_0 + \text{ind}[i'], \qquad (3)$$

where ind is a defined array of values or programmed offsets. The data value s' at address index i' in S' is related to the data value s in S by $$s'[i'] = s[i_0 + \text{ind}[i']]. \qquad (4)$$

Data indicating the state of the rearranged data is maintained with the rearranged segment itself. The state data may include the state of a write-back reduction filter, such as a hash filter, that tracks, in a probabilistic manner, indexes within S' of data that has been changed.

Some embodiments relate to a data processing system that includes a host processing unit and a DRE processor. The host processing unit has the capability of sending a rearrangement command to a DRE of a memory system which may or not be on its cache coherence network. The DRE processor, (e.g. a compute element or state machine) is capable of recognizing the command at the memory device and also capable of translating addresses based on physical offsets from a base page address and also capable of signaling when the rearrangement is done for the host processor to fetch.

FIG. 1 is a block diagram of a data processing system 100 in accordance with embodiments of the disclosure. The system 100 includes one or more host processing units 102 that access memory system 104. In the example shown, each host processor 102 accesses data via a level (L1) cache 106 and shared level (L2) cache 108. An application executed on a host processor 102 may access data stored in one or more storage devices 110. Data may be moved through an interconnect circuit or bus by a memory controller such as Memory Management Unit (MMU) 112, for example.

In order to improve the efficiency of access to the data, a data rearrangement engine (DRE) 114 rearranges the data from one memory region (region S) in a storage device 110 and stores it in another memory region (region S) in the same storage device or a different storage device. The data may be rearranged, for example, based on a pattern provided by a programmer, determined dynamically, or determined online via a statistical profiling or other machine learning method.

Host processing unit (HPU) 102 include core processor 116 that is capable of executing a user application program. The application program, in turn, utilizes an Application Programming Interface (API) 118. The API may comprise an Instruction Set Architecture (ISA) implemented in HPU 102, as shown, or the API may reside in programming language-level mechanisms. In a further embodiment, the API comprises a set of subroutine definitions, protocols and tools for building software and applications to be executed by core 116. In particular, API 118 enables a programmer to access hardware interface 120 for communication with a corresponding interface 122 of DRE 114. Thus, interface 122 is operable to receive commands from one or more host processing units 102.

DRE 114 also includes processor 124 that is responsive to commands received via interface 122 from at least a first host processing unit 102.

In response to an 'allocate' command from the first host processing unit, DRE processor 124 allocates, in storage devices 110, a first (destination) memory region that contains a user data region and a metadata memory region. The metadata region may comprise one or more contiguous pages of memory arranged with sequential addresses before the user data segment. Data stored in this region is used to control how the DRE manipulates data in the user data region.

In response to a 'rearrange' command from the first host processing unit, DRE processor initializes the metadata memory region dependent upon the 'rearrange' command; and copies data from non-contiguous memory addresses in a second (source) memory region in storage devices 110 to contiguous memory addresses in the first (destination) memory region, in accordance with a forward address translation function. The destination memory region is accessible by at least the first host processor, enabling the application executed on the first host processor to process data arranged with contiguous addresses. This results in more efficient data transfer and better utilization of the caches.

Programming instructions that define the data rearrangement may be stored in memory accessible by the DRE. Alternatively, the programming instructions may be moved or copied from another memory location into a memory location accessible by the DRE in response to a command. A 'rearrange' command may contain pointers to forward and/or reverse functions, or the instructions themselves, or an indicator of which function should be used.

DRE interface 122 may be further operable to transmit status signals to the one or more host processing units 102. For example, DRE processor 124 may be configured to transmit a status signal to the first host processor 102 when the copying of data is complete.

Coherence issues arise when making second memory region (S) contiguous in the first memory region (S'). Coherence issues arise when cache lines are resident within the host processing unit that contain addresses that map to region S. Coherence issues also arise when cache lines from another processor core contain addresses that map to region S. For both of these cases, the cache lines that contain elements of S resident within the coherence domain of the shared memory space are flushed to memory to ensure that S' contains the most recent values (namely, the sequentially consistent memory view). Thus, it is useful to know the bound of S a priori. Accordingly, in response to the 'rearrange' command, copies of data in the second memory region that are held in a cache of the one or more core processor are written back to source memory region prior to copying data from non-contiguous memory addresses in the source memory region to contiguous memory addresses in the destination memory region. In addition, in response to the 'rearrange' command, write access to the source memory region may be blocked until a corresponding 'release' command is received from the first host processing unit or is generated automatically. In some embodiments a component of the system, such as the operating system (OS), run-time or hardware, maintains a table or counter for each rearranged memory region Si. This enables counting of memory allocation/de-allocation references. For example, on each memory allocate operation a counter may be incremented and on each memory de-allocate operation the counter is decremented. When the counter reaches zero, the OS, run-time or hardware may initiate a 'release' to re-enable write access to the source memory region S. Write access to the source memory region is re-enabled when all memory allocated in the user data has been de-allocated. Thus, the enabling/disabling of write accesses may be performed automatically or via explicit programming instructions.

Synchronization issues arise when the values within S' are modified. In some embodiments, a 'scatter' mechanism is included to map the values within S' back to S. Thus, in response to a 'sync' command from the first host processing unit, the DRE may copy data from one or more contiguous memory addresses in the destination memory region (S') back to non-contiguous memory addresses in the source memory region (S) in accordance with a reverse address translation function. The one or more contiguous memory addresses in the destination memory region to be copied may be selected with reference to a write-back reduction filter. The state of the write-back reduction filter is updated dependent upon an address of data written to the destination memory region. In this way, the number of unchanged data values written back is reduced.

In response to a 'free' command from the first host processing unit, the destination memory region and the contained user data and metadata regions are de-allocated.

The memory management unit 112 and the data rearrangement engine 114 may form an integrated circuit. Alternatively, a storage device 110 and the data rearrangement engine 114 may form an integrated circuit.

FIG. 2 is a diagrammatic representation of a destination memory region 200 allocated by a DRE in accordance with embodiments of the disclosure. Region 200 includes user data area 202 for storing data copied from non-contiguous memory addresses. The copied data is rearranged to be at contiguous addresses in user data region 202. This data may be accessed by a user application executed on a host processing unit. Region 200 also includes a metadata region 204. Data stored in this region is 'metadata', that is, data relating to or descriptive of the data in user data region 202. Data stored in region 204 may not be accessible by the host processing unit, but is accessible by the processor of the DRE. The metadata memory region 204 may be initialized dependent upon information in the 'rearrange' command. The metadata may include, for example, a length of the data to be copied, a reorganization type (such as 'offset', 'programmable', or 'bi-directional'), and initial values for a state of a write-back reduction filter (such as a Bloom filter, for example). In addition, the metadata may include a pointer to, or instructions for, a forward address translation function or a pointer to, or instructions for, a reverse address translation function.

In the example shown, metadata region 204 is structured to store a length (such as a 64-bit length) of the data segment in region 206, a rearrangement type specifier (such as 'offset', 'programmable', 'bi-directional') in region 208, a pointer to a forward address translation function (if any) in region 210, a pointer to a reverse address translation function (if any) in region 212, and a state of a write-back reduction filter in region 214. The write-back reduction filter may be a Bloom filter, for example. The arrangement of data in destination memory region 200 may be varied without departing from the disclosure. However, it may be advantageous to have the user data region and metadata stored in contiguous regions.

The write-back reduction filter provides the ability to maintain the state of a memory without synchronizing to source memory region every time data in S' is changed and without writing back the entire S' segment to source memory region. An example of a write-back filter is described in pending patent application titled 'Memory Synchronization Filter', application Ser. No. 14/978,001, filed Dec. 22, 2015, which is hereby incorporated by reference herein. The state of the filter, such as a Hash List, is maintained in the metadata region, while the filter logic, such as hash functions and comparison logic, may be incorporated with the DRE. A Hash List is a bit vector that provides a persistent memory of which writes have occurred to the region S'. The Hash List may be constructed by various methods, including known methods such as a Bloom Filter, Cuckoo hashing or others methods. These methods may have different rates of false positive results, which cause a small amount of unmodified data to be written back to memory, but they do not give any false negatives, so accurate synchronization is achieved. In other words, the filter allows data to be classified as either 'possibly modified' or 'definitely not modified'.

Figure 3:
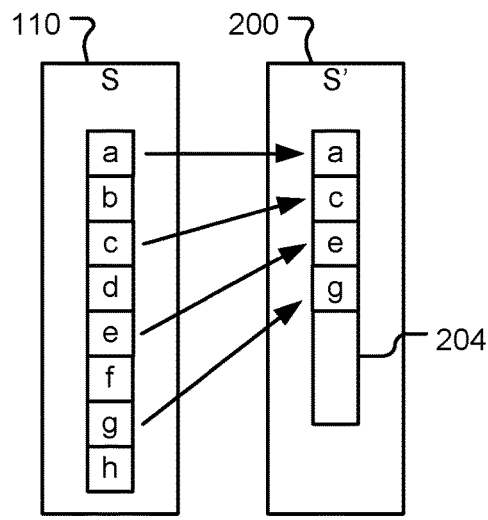
FIGS. 3-6 are diagrammatic representations of exemplary address translation functions, in accordance with various representative embodiments.

FIG. 3 is a diagrammatic representation of data rearrangement in accordance with embodiments of the disclosure. FIG. 3 shows an example of a simple offset function in which the offset is 2. That is, alternate data elements {a, c, e, g} from source memory region 110 (S) are rearranged to become consecutive data elements in destination memory region 200 (S'). Metadata region 204 in memory region 200 (S') is populated to indicate, for example, that the data rearrangement is a simple offset, that the index in S and the index is S' are related by i=2i'.

Figure 4:
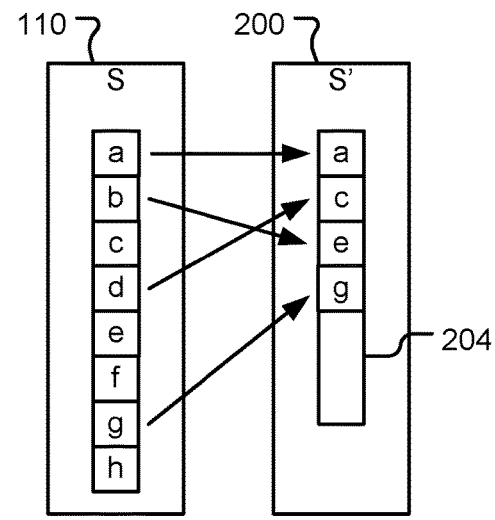

FIG. 4 is a diagrammatic representation of further data rearrangement, in accordance with embodiments of the disclosure. FIG. 4 shows an example of a bijective rearrangement of the type described in equations (3) and (4) above. Here the index array is ind=[0,3,1,6] with $i_0$=0. The function is bijective and can be reversed to write data from S' back to S.

Figure 5:
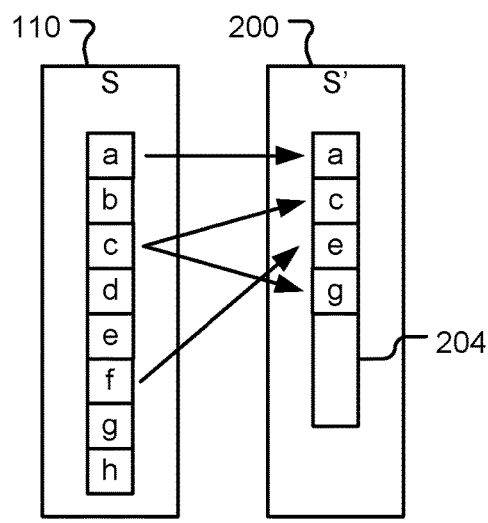

FIG. 5 is a diagrammatic representation of further data rearrangement, in accordance with embodiments of the disclosure. Here the index array for the forward address translation function is ind=[0,2,5,2] with $i_0$=0. The function is not bijective, since the second and fourth element cannot both be written back to the same location in S.

Figure 6:
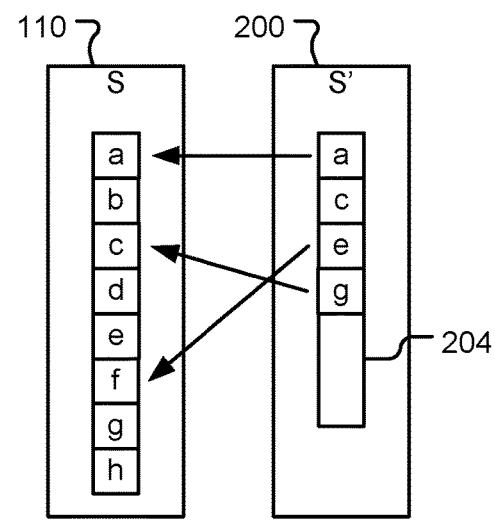

FIG. 6 is a diagrammatic representation of a reverse address translation function from S' back to S corresponding to the forward address translation filter shown in FIG. 5. The index array for the reverse address translation function is ind=[0,-,5,2] with $i_0$=0, so not all elements are written back. In this example, both forward and reverse address translation functions are defined in the 'rearrange' command, either by reference to function pointers or by the inclusion of instructions.

Figure 7:
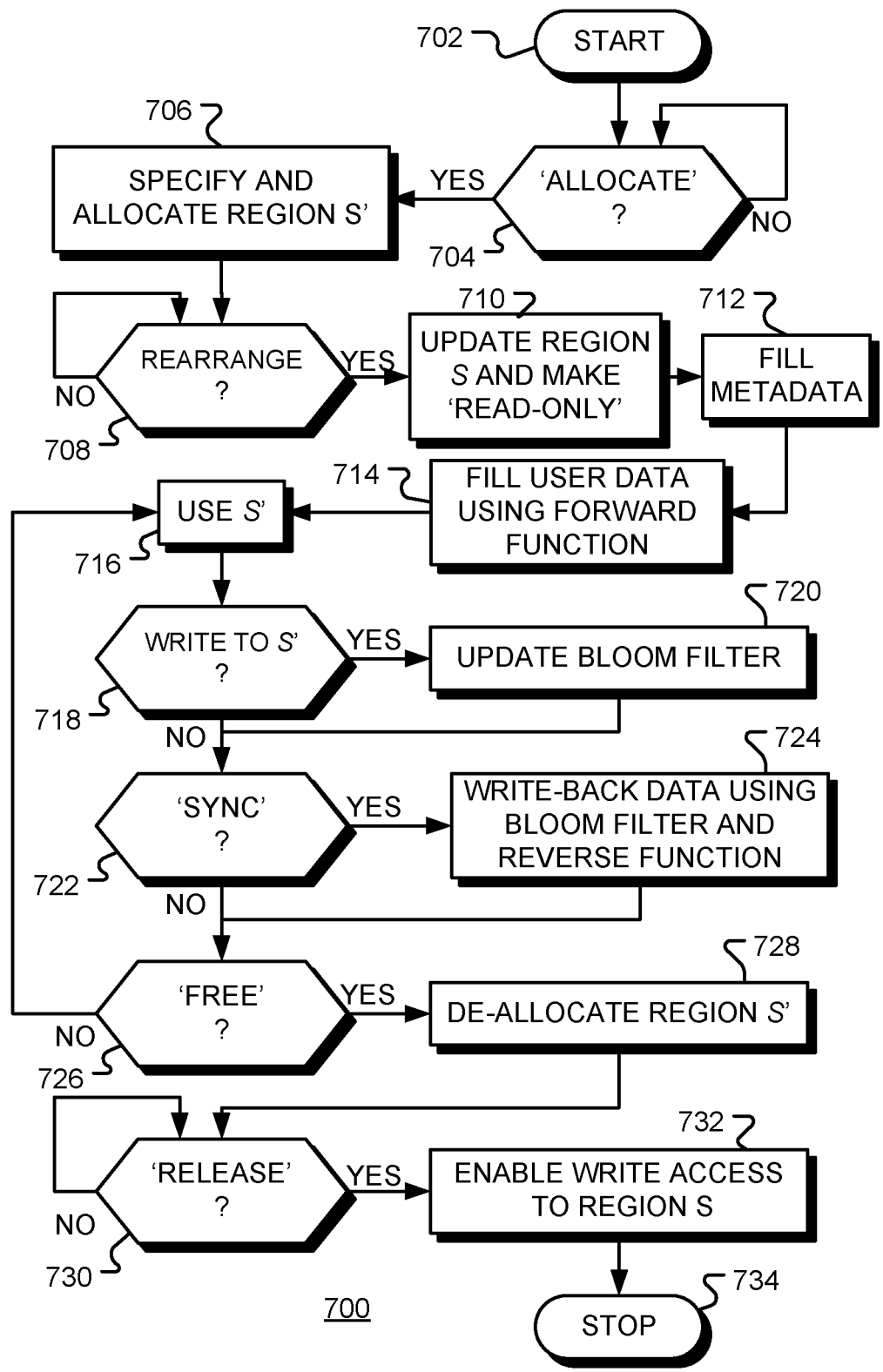
FIG. 7 is a flow chart of a method of data processing, in accordance with various representative embodiments.

FIG. 7 is a flow chart 700 of a method of operation of data processing system that incorporates a data rearrangement engine (DRE), in accordance with various representative embodiments. Following start block 702 in FIG. 7, the DRE waits at decision block 704 until an 'allocate' command is received from a host processing unit. When an 'allocate' command is received, as depicted by the positive branch from decision block 704, a destination memory region S' is allocated at block 706 and the region is designated for rearranged data. Flow continues to decision block 708. When a 'rearrange' command is received, as depicted by the positive branch from decision block 708, the source memory region S is updated (by writing back data from caches containing modified copies of data in S) and then locked to prevent write accesses at block 710. Read accesses may be allowed, in which case access to the source memory region S is made 'read only'. At block 712 a metadata region of the destination memory is filled with data descriptive of the type, size and manner of the rearrangement and, at block 714, the user data region of destination memory is filled with rearranged data from the source memory region. At block 716, the user data in memory region S' may be accessed. Optionally, a signal may be transmitted to the host processing unit when the user data in S' is ready for access.

When S' is in use, data values may be written to the memory as depicted by the positive branch from decision block 718. When this occurs, a data reduction filter, such as Bloom filter, is updated at block 720 to indicate that the data has been changed.

When a 'sync' command is received by the DRE, as depicted by the positive branch from decision block 722, data is copied from S' back to S, at block 724. Data that the data-reduction filter indicates to be unchanged does not need to be written back. Other data, which is possibly changed, is written back. A reverse address translation function is used to translate addresses in S' to corresponding addresses in S.

When a 'free' command is received by the DRE, as depicted by the positive branch from decision block 726, the memory region S' is de-allocated at block 728. In some embodiments, the memory region S' may be accessed by multiple threads, each having a window on S'. In these embodiments the memory region S' is not de-allocated until it has been freed by all threads, i.e., all windows have been closed. The region S' is then no longer in use and flow continues to decision block 730. If S' has not been freed by all threads, as depicted by the negative branch from decision block 726, flow returns to block 716 and S' remains in use.

When a 'release' command is received by the DRE, as depicted by the positive branch from decision block 730, the memory region S is unlocked at 732 and write accesses are again enabled. In a further embodiment, memory region S may be unlocked automatically by the hardware, operating system or run-time environment. For example, reference counting may be used to determine when the region should be unlocked, as described above. Write access to the source memory region is re-enabled when all memory allocated in the user data has been de-allocated. Thus, a 'release' command may be received from a host processor or generated automatically by the hardware. The method terminates at block 734.

The DRE may be implemented in dedicated hardware, reconfigurable hardware, software, of a combination thereof. Dedicated or reconfigurable hardware may be described by instructions of a Hardware Description Language such as Verilog or VHDL, for example. The instructions may be stored for distribution on non-transient computer readable media, or distributed via a network, such as the Internet, or by other means.

It will be appreciated that some or all functions described herein could be implemented by custom logic, such a state machine, that has no stored program instructions, in one or more application specific integrated circuits (ASICs), in reconfigurable logic such as an FPGA, or in one or more programmed processors having stored instructions. Of course, a combination of these approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such integrated circuits, software instructions and programs with minimal experimentation.

As used herein, the term processor, controller or the like may encompass a processor, controller, microcontroller unit (MCU), microprocessor, graphics processing unit (GPU), a digital signal processor (DSP), a field programmable gate array (FPGA), an application specific integrated circuit (ASIC) device, a memory controller or an I/O master device.

Those skilled in the art will recognize that the present disclosure has been described in terms of exemplary embodiments, but is not so limited. The present disclosure could be implemented using hardware components, such as special purpose hardware and/or dedicated processors which are equivalents to the disclosure as described and claimed. Similarly, general purpose computers, microprocessor based computers, micro-controllers, optical computers, analog computers, dedicated processors and/or dedicated hard wired logic may be used to construct alternative equivalent embodiments of the present disclosure.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present disclosure. For example, the order of certain operations carried out can often be varied, additional operations can be added or operations can be deleted without departing from the disclosure. Error trapping can be added and/or enhanced and variations can be made in user interface and information presentation without departing from the present disclosure. Such variations are contemplated and considered equivalent.

According, some features of the disclosed embodiments are set out in the following numbered items:

1. A memory system comprising: a data rearrangement engine; and one or more storage devices providing a plurality of memory regions, wherein the data rearrangement engine comprises: an interface operable to receive commands from one or more host processing units; a processor, responsive to commands received via the interface from at least a first host processing unit of the one or more host processing units, configured for: responsive to a 'rearrange' command from the first host processing unit: initializing a metadata memory region dependent upon the 'rearrange' command, the metadata memory region being located in a destination memory region that contains a user data memory region and the metadata memory region; and copying data from non-contiguous memory addresses in a source memory region of the plurality of memory regions to contiguous memory addresses in the user data memory region of the destination memory region, in accordance with a forward address translation function, where the user data memory region is accessible by at least the first host processing unit.

2. The data processing system of item 1, where the processor is further configured for: responsive to an 'allocate' command from the first host processing unit: allocating, in a memory region of the plurality of memory regions, the destination memory region that contains the user data memory region and the metadata memory region.

3. The data processing system of item 2, wherein the processor is further configured for: responsive to a 'free' command from the first host processing unit, de-allocating the destination memory region.

4. The data processing system of item 1, wherein the interface is further operable to transmit status signals to the one or more host processing units and where the processor of the data rearrangement engine is configured to transmit a status signal to the first host processor when the copying of data is complete.

5. The data processing system of item 1, wherein initializing the metadata memory region dependent upon the 'rearrange' command further comprises the processor: storing a length of the data to be copied; storing a rearrangement type; storing a pointer to, or instructions for, the forward address translation function; and storing initial values for a state of a write-back reduction filter.

6. The data processing system of item 1, wherein the processor of the data rearrangement engine is further configured for, responsive to a 'sync' command from the first host processing unit, copying data from one or more contiguous memory addresses in the user data memory region to non-contiguous memory addresses in the source memory region in accordance with a reverse address translation function, and wherein initializing the metadata memory region dependent upon the 'rearrange' command comprises storing a pointer to, or instructions for, the reverse address translation function.

7. The data processing system of item 6, wherein the one or more contiguous memory addresses in the user data memory region to be copied to the source memory region are selected with reference to a write-back reduction filter.

8. The data processing system of item 7, wherein the processor of the data rearrangement engine is configured to update the state of the write-back reduction filter dependent upon an address of data written to the destination memory region.

9. The data processing system of item 1, wherein the processor is further configured for, responsive to the 'rearrange' command from the first host processing unit, blocking write access to the source memory region by the one or more host processing units; and responsive to a 'release' command from the first host processing unit, unblocking write access to the source memory region.

10. The data processing system of item 1, wherein the processor is further configured for, responsive to the 'rearrange' command from the first host processing unit, blocking write access to the source memory region by the one or more host processing units; and unblocking write access to the source memory region when all memory allocated in the user data has been de-allocated.

11. The data processing system of item 1, wherein the processor is further configured for, responsive to the 'rearrange' command from the first host processing unit, causing copies of data in the source memory region that are held in a cache of the one or more host processing units to be written back to source memory region prior to copying data from non-contiguous memory addresses in the source memory region to contiguous memory addresses in the user data memory region of the destination memory region.

12. The data processing system of item 1, wherein the data rearrangement engine is integrated with a storage device of the one or more storage devices.

13. The data processing system of item 1, further comprising a memory management unit operable to access the one or more storage devices, wherein the data rearrangement engine is integrated with the memory management unit.

14. A data processing system comprising: one or more host processing units each having a first interface; a memory system having a second interface, the memory system comprising: one or more storage devices providing a plurality of memory regions; and a data rearrangement engine operable to move data between memory regions of the plurality of memory regions; an interconnect circuit that couples between the first interfaces of the one or more host processing units and the second interface of the memory system, wherein the data rearrangement engine is configured to rearrange data stored in a source memory regions of the plurality of memory regions into a destination region responsive to a rearrangement specified by a first host processing unit of the one or more host processing units via the interconnect circuit.

15. The data processing system of item 14, wherein the rearranged data in the destination memory region is accessible by the first host processing device.

16. The data processing system of item 14, further comprising a memory management unit operable to access the one or more storage devices, wherein the data rearrangement engine is integrated with the memory management unit.

17. A method of data processing comprising, responsive to first commands received by a data rearrangement engine of a memory system from a first host processing unit of one or more host processing units, the data rearrangement engine: initializing a metadata memory region dependent upon a specified data rearrangement; copying data from non-contiguous memory addresses in a source memory region of the memory system to contiguous memory addresses in a user data memory region of the memory system, in accordance with the specified data rearrangement; and enabling access to the user data memory region by one or more host processing units.

18. The method of item 17, further comprising: allocating, in the memory system, the user data memory region and the metadata memory region.

19. The method of item 17, further comprising, responsive to a 'free' command received by the data rearrangement engine from the first host processing unit, the data rearrangement engine: de-allocating the user data memory region and the metadata memory region.

20. The method of item 17, further comprising: prior to copying data, blocking write access to the source memory region by the one or more host processing units; and responsive to a 'release' command from the first host processing unit, unblocking write access to the source memory region.

21. The method of item 17, further comprising: causing copies of data in the source memory region that are held in a cache of the one or more host processing units to be written back to the source memory region prior to copying data from non-contiguous memory addresses in the source region of the memory system to contiguous memory addresses in the destination region of the memory system.

22. The method of item 17, further comprising signaling the first host processing units when the copying of data is complete.

23. The method of item 17, further comprising, responsive to write command from the first host processing unit: writing a data value to an address in the user data memory region; and updating a write-back reduction filter dependent upon the address.

24. The method of item 23, further comprising, responsive to a 'sync' command received by the data rearrangement engine from the first host processing unit: for each selected address of one or more contiguous memory addresses in the user data memory region, the data rearrangement engine: determining by the write-back reduction filter if data at the selected address is possibly changed; and if the data at the selected address is possibly changed, copying data from the selected address in the user data memory region to a corresponding address in the source region of the memory system dependent upon the specified data rearrangement.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A data processing system comprising:

a data rearrangement engine; and one or more storage devices providing a plurality of memory regions, wherein the data rearrangement engine comprises:

an interface operable to receive commands from one or more host processing units;

a processor, responsive to commands received via the interface from at least a first host processing unit of the one or more host processing units, configured for:

responsive to a 'rearrange' command from the first host processing unit:

initializing a metadata memory region, dependent upon the 'rearrange' command, with a pointer to, or instructions for, a forward address translation function, the metadata memory region being located in a destination memory region that contains a user data memory region and the metadata memory region; and copying data from non-contiguous memory addresses in a source memory region of the plurality of memory regions to contiguous memory addresses in the user data memory region of the destination memory region, in accordance with the forward address translation function, where the user data memory region is accessible by at least the first host processing unit, the method further comprising, responsive to processing instructions of an application executed on the first host processing unit:

transferring data, with contiguous addresses in the user data region, between the user data region and one or more cache lines of a cache of the first host processing unit.

2. The data processing system of claim 1, where the processor is further configured for:
responsive to an 'allocate' command from the first host processing unit:
allocating, in a memory region of the plurality of memory regions, the destination memory region that contains the user data memory region and the metadata memory region.

3. The data processing system of claim 2, wherein the processor is further configured for:
responsive to a 'free' command from the first host processing unit, de-allocating the destination memory region.

4. The data processing system of claim 1, wherein the interface is further operable to transmit status signals to the one or more host processing units and where the processor of the data rearrangement engine is configured to transmit a status signal to the first host processor when the copying of data is complete.

5. The data processing system of claim 1, wherein initializing the metadata memory region dependent upon the 'rearrange' command further comprises the processor:
storing a length of the data to be copied;
storing a rearrangement type; and
storing initial values for a state of a write-back reduction filter.

6. The data processing system of claim 1, wherein the processor of the data rearrangement engine is further configured for,
responsive to a 'sync' command from the first host processing unit, copying data from one or more contiguous memory addresses in the user data memory region to non-contiguous memory addresses in the source memory region in accordance with a reverse address translation function, and
wherein initializing the metadata memory region dependent upon the 'rearrange' command comprises storing a pointer to, or instructions for, the reverse address translation function.

7. The data processing system of claim 6, wherein the one or more contiguous memory addresses in the user data memory region to be copied to the source memory region are selected with reference to a write-back reduction filter.

8. The data processing system of claim 7, wherein the processor of the data rearrangement engine is configured to update the state of the write-back reduction filter dependent upon an address of data written to the destination memory region.

9. The data processing system of claim 1, wherein the processor is further configured for,
responsive to the 'rearrange' command from the first host processing unit, blocking write access to the source memory region by the one or more host processing units; and
responsive to a 'release' command from the first host processing unit, unblocking write access to the source memory region.

10. The data processing system of claim 1, wherein the processor is further configured for,
responsive to the 'rearrange' command from the first host processing unit, blocking write access to the source memory region by the one or more host processing units; and
unblocking write access to the source memory region when all memory allocated in the user data memory region has been de-allocated.

11. The data processing system of claim 1, wherein the processor is further configured for,
responsive to the 'rearrange' command from the first host processing unit, causing copies of data in the source memory region that are held in a cache of the one or more host processing units to be written back to source memory region prior to copying data from non-contiguous memory addresses in the source memory region to contiguous memory addresses in the user data memory region of the destination memory region.

12. The data processing system of claim 6, wherein the data rearrangement engine is integrated with a storage device of the one or more storage devices.

13. The data processing system of claim 1, further comprising a memory management unit operable to access the one or more storage devices, wherein the data rearrangement engine is integrated with the memory management unit.

14. A data processing system comprising:
one or more host processing units each having a first interface;
a memory system having a second interface, the memory system comprising:
one or more storage devices providing a plurality of memory regions; and
a data rearrangement engine operable to move data between memory regions of the plurality of memory regions;
an interconnect circuit that couples between the first interfaces of the one or more host processing units and the second interface of the memory system,
wherein a first host processing unit of the one or more host processing units is configured to issue a 'rearrange' command to the data rearrangement engine via the interconnect circuit,
wherein, responsive to the 'rearrange' command, the data rearrangement engine initializes a metadata memory region, of the plurality of memory regions, with a pointer to, or instructions for, a forward address translation function and rearranges data stored in a source memory region of the plurality of memory regions into a destination memory region in accordance with the forward address translation function, and
wherein the first host processing unit is further configured to execute instructions of an application that cause data in the destination memory region to be transferred between the destination memory region and one or more cache lines of a cache of the first host processing unit.

15. The data processing system of claim 14, wherein the rearranged data in the destination memory region is accessible by the first host processing device.

16. The data processing system of claim 14, further comprising a memory management unit operable to access the one or more storage devices, wherein the data rearrangement engine is integrated with the memory management unit.

17. A method of data processing comprising, responsive to first commands received by a data rearrangement engine of a memory system from a first host processing unit of one or more host processing units, the data rearrangement engine:
initializing a metadata memory region with a pointer to, or instructions for, a forward address translation function for a specified data rearrangement;
copying data from non-contiguous memory addresses in a source memory region of the memory system to contiguous memory addresses in a user data memory region of the memory system, in accordance with the forward address translation function for the specified data rearrangement; and enabling access to the user data memory region by one or more host processing units the method further comprising, responsive to processing instructions of an application executed on a first host processing unit of the one or more host processing units:

transferring data, with contiguous addresses in the user data memory region, between the user data memory region and one or more cache lines of a cache of the first host processing unit.

18. The method of claim 17, further comprising:

allocating, in the memory system, the user data memory region and the metadata memory region.

19. The method of claim 17, further comprising, responsive to a 'free' command received by the data rearrangement engine from the first host processing unit, the data rearrangement engine:

de-allocating the user data memory region and the metadata memory region.

20. The method of claim 17, further comprising:

prior to copying data, blocking write access to the source memory region by the one or more host processing units; and responsive to a 'release' command from the first host processing unit, unblocking write access to the source memory region.

21. The method of claim 17, further comprising:

causing copies of data in the source memory region that are held in a cache of the one or more host processing units to be written back to the source memory region prior to copying data from non-contiguous memory addresses in the source region of the memory system to contiguous memory addresses in the destination region of the memory system.

22. The method of claim 17, further comprising signaling the first host processing unit when the copying of data is complete.

23. The method of claim 17, further comprising, responsive to write command from the first host processing unit:

writing a data value to an address in the user data memory region; and updating a write-back reduction filter dependent upon the address.

24. The method of claim 23, further comprising, responsive to a 'sync' command received by the data rearrangement engine from the first host processing unit:

for each selected address of one or more contiguous memory addresses in the user data memory region, the data rearrangement engine:

determining by the write-back reduction filter if data at the selected address is possibly changed; and if the data at the selected address is possibly changed, copying data from the selected address in the user data memory region to a corresponding address in the source region of the memory system dependent upon the specified data rearrangement.

* * * * *